United States Patent [19]
Horton

[11] 3,965,713
[45] June 29, 1976

[54] METHOD AND APPARATUS FOR LAYING CONTINUOUS PIPE

[75] Inventor: Edward E. Horton, Portuguese Bend, Calif.

[73] Assignee: Deep Oil Technology, Inc., Long Beach, Calif.

[22] Filed: May 28, 1974

[21] Appl. No.: 473,568

[52] U.S. Cl. .................................. 72/146; 72/183; 242/159; 242/174
[51] Int. Cl.² ...................... B21D 11/06; B21D 7/08
[58] Field of Search ............... 61/72.1, 72.3; 166/77; 72/183, 146; 242/82, 83, 174, 176, 178, 159; 254/134.35 C

[56] References Cited
UNITED STATES PATENTS

| | | | |
|---|---|---|---|
| 2,839,187 | 6/1958 | Norman et al. | 242/174 |
| 3,337,154 | 8/1967 | Smith et al. | 242/83 |
| 3,372,461 | 3/1968 | Tesson | 61/72.3 |
| 3,680,342 | 8/1972 | Mott et al. | 61/72.1 |
| 3,724,567 | 3/1973 | Smitherman | 166/77 |
| 3,785,587 | 1/1974 | Meyfarth et al. | 242/82 |

Primary Examiner—Lowell A. Larson
Attorney, Agent, or Firm—Poms, Smith, Lande & Glenny

[57] ABSTRACT

A method and apparatus for laying continuous pipe particularly for offshore oil installations and wherein said continuous pipe is pre-formed into flat spirals of pre-selected inner and outer diameters depending upon available handling equipment and arranged in stacks in which each flat spiral is interconnected with the adjacent flat spiral. A stack of flat pipe spirals is positioned on a power driven rotatable pipe spiral carrier mounted on a deck of a pipe laying vessel. Pipe is withdrawn from the stack of spirals by rotating the pipe carrier and moving the pipe through pipe straightening and tensioning means, after which the pipe is fed to suitable pipe laying means for connecting the pipe to subsea installations.

7 Claims, 6 Drawing Figures

METHOD AND APPARATUS FOR LAYING CONTINUOUS PIPE

BACKGROUND OF INVENTION

Subsea installations, particularly oil or well installations, are often connected with pipe which is laid along the sea floor for the purpose of conducting fluid such as gas, oil, and water from a subsea installation to another installation or to an onshore installation or to an offshore platform or vessel. Such pipe may be of different diameter and in length may amount to thousands of feet. It is apparent that because of the environment in which the pipe must be laid, many problems are encountered.

Prior proposed pipe laying arrangements have included stacking a supply of straight pipe lengths on a barge and connecting as by welding the ends of the straight pipe lengths as required during the pipe laying operation. Such intermittent step-by-step laying of pipe is time consuming and costly.

To obviate the disadvantages of welding ends of straight pipe together on a vessel at sea for providing a continuous pipe, other prior proposed constructions included the winding of pipe on a drum of a reel. The reel was mounted on a barge or vessel and the pipe lengths were welded together prior to being wound upon the reel. In this system the drum of the reel was made very strong and heavy to carry the pipe. As pipe was drawn onto the reel by rotation of the reel the pipe was coiled in the form of a cylinder about the drum for the length of the drum and then a second cylindrical form of coil turns was wound upon the first coil. Since the pipe was wound under tension and such forces acted at surface areas of the pipe caused by bending and interfaced contact with adjacent pipe coils, protective coatings applied to the pipe would be damaged, marred, or broken. A pipe reel containing pipe cylindrically coiled about its drum was extremely heavy and difficult to manipulate. Moreover, the winding operation was preferably performed on the vessel because the wound pipe reel was too heavy to handle or required special derrick equipment in order to transfer such a pipe-filled reel from a dock or pier to a vessel.

Examples of prior proposed constructions showing pipe wound upon a reel are British Pat. No. 601,103 and U.S. Pat. No. 3,685,306 in which the reel axis is horizontal and U.S. Pat. Nos. 3,237,438, 3,372,461, 3,712,100 and 3,630,461 in which the reel axis is vertical. In such prior constructions the path of pipe from the point of departure from the reel to the straightening means varies horizontally or vertically with each coil turn and is continually changing in the direction of approach to the straightening means over a relatively wide range, that is the length of the cylindrical form.

Prior proposed pipe laying constructions of these types presented difficulties and limitations in handling because of the structural strength required, transfer of the pipe fitted reel from one place to another, and difficulties encountered in withdrawing a pipe from a cylindrical form and in laying pipe of different diameter.

SUMMARY OF INVENTION

The present invention contemplates a novel pipe laying apparatus and method which is economically more feasible and includes advantages not found in the prior proposed pipe laying devices. Generally speaking the present invention contemplates the use of a flat pipe spiral having selected inner and outer diameters, for example about 24 feet and 33 feet respectively and formed by bending the pipe beyond its elastic limit to a mean or average radius of curvature for the spiral. Each flat pipe spiral may be stacked one upon the other with inner and outer ends of the flat pipe spirals being joined together by welding. A vertical stack of a selected number of flat pipe spirals may be thus assembled under most favorable plant conditions for fabricating such flat pipe spirals. Depending upon equipment available at the dock, a selected number of flat pipe spirals connected together may be transported as a unit without cumbersome reel weight and transfered to a vessel or barge having thereon a pipe carrier means adapted to receive, hold and pay out the pipe in said unit of flat pipe spirals. The vessel may also carry additional units of assembled pipe spirals which may be readily secured since they are flat and generally non-movable except by cranes or boom rigs of adequate strength.

The present invention further contemplates the paying out of pipe from such a unit of flat pipe spirals on a pipe carrier means by rotating the pipe carrier means about an axis defined by the carrier means while controllably driving the carrier means and pulling the pipe through a pipe straightening roll means whereby the straightened pipe may be tensioned, supported and moved downwardly through the sea to a subsea installation by suitable means, one of which is described in my co-pending application Ser. No. 256,740 filed May 25, 1972. Briefly, in said application, pipe is suspended by hangers from a tensioned cable or messenger line, the pipe not being initially subject to tension except with respect to gravitational forces but in effect pushed or drawn along the tensioned cable line until its leading end is moved into connected relationship with the subsea installation.

It is therefore the primary object of the present invention to provide a novel apparatus and method for laying continuous pipe particularly for offshore transport of fluids such as gas or liquids including oil, water and the like.

An object of the invention is to provide a continuous pipe formed or wound into a flat spiral to facilitate fabrication, transport, handling and installation such as laying the continuous pipe from a vessel.

Another object of the invention is to provide flat pipe spirals which are interconnected and arranged in an axial stack to provide a unit of stacked flat spirals for shipping and handling of various unit sizes depending upon handling facilities available.

Another object of the invention is to provide an apparatus for laying pipe arranged in flat spiral form, said apparatus including means for restraining the spiral pipe to maintain such spiral configuration.

A further object of the invention is to provide an apparatus adapted to rotatably support pipe spiral units on a deck with the axis of the spiral units vertically disposed and wherein means are provided for guiding and supporting the pipe turn being withdrawn from the spiral unit along a path which departs the spiral unit at virtually the same location for entry into a pipe straightening means, and wherein horizontal and vertical displacement of said departure location is virtually unchanged.

A further object of the invention is to provide a flat pipe spiral wherein the spiral pipe turns are formed about a mean radius of curvature between the radii of said inner and outer peripheral coils whereby inner peripheral spiral turns are stressed to expand radially and outer peripheral spiral turns are stressed to contract radially.

A further object of the present invention is to provide a pipe carrier means for flat pipe spiral units or assemblies including means for rotatably driving said carrier means to rotate said spiral unit for controllably moving pipe being drawn from said spiral unit through a pipe straightening means.

A still further object of the present invention is to provide, as an article of manufacture, a flat pipe spiral adapted for laying a continuous pipe line.

A still further object of the present invention is to provide a novel method of providing a continuous pipe for laying such pipe from a stationary or moving vessel.

Generally speaking, this invention contemplates a method of handling continuous pipe to facilitate laying of such pipe between spaced locations in which a pipe is wound into a flat spiral configuration comprising a plurality of pipe turns made in a plane normal to the axis of the spiral, placing such a pipe spiral on a pipe carrier means rotatable about said axis, restricting movement of the spiral pipe turns to maintain the spiral configuration while on the carrier means, rotating the carrier means and directing a free end of the pipe tangentially away from the pipe spiral during such rotation, and passing the pipe through a pipe straightening means and a pipe tensioning means.

Various other objects and advantages of the present invention will be readily apparent from the following description of the drawings in which an exemplary embodiment of the invention is shown.

Figures 1, 3:
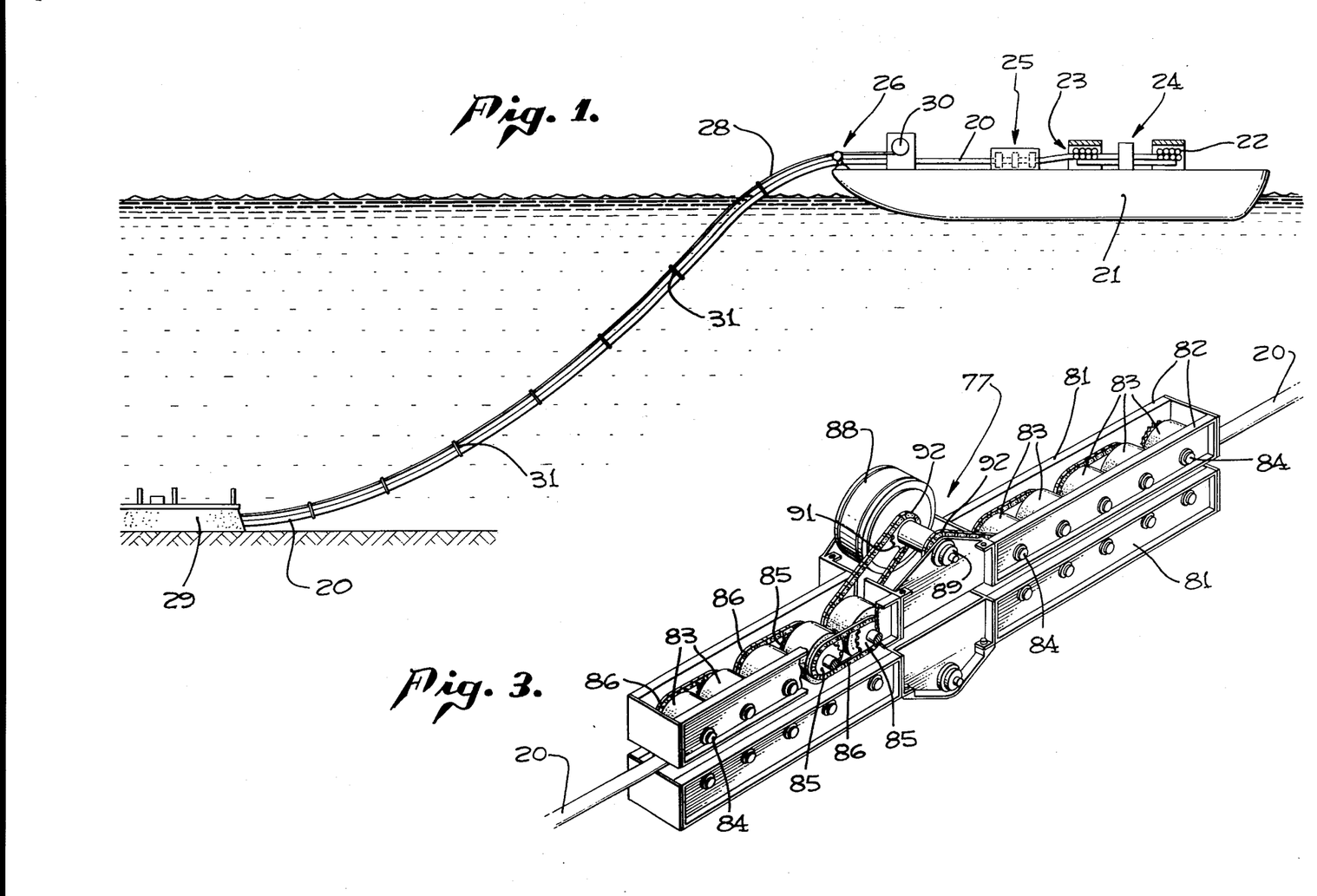
FIG. 1 is a schematic elevational view of a subsea installation, pipe laying vessel, and a pipe extending between the subsea installation and the vessel, a unit of flat pipe spirals being shown on the vessel.
FIG. 3 is an enlarged fragmentary perspective view of a pipe tensioning means shown in FIG. 2.
Figure 2:
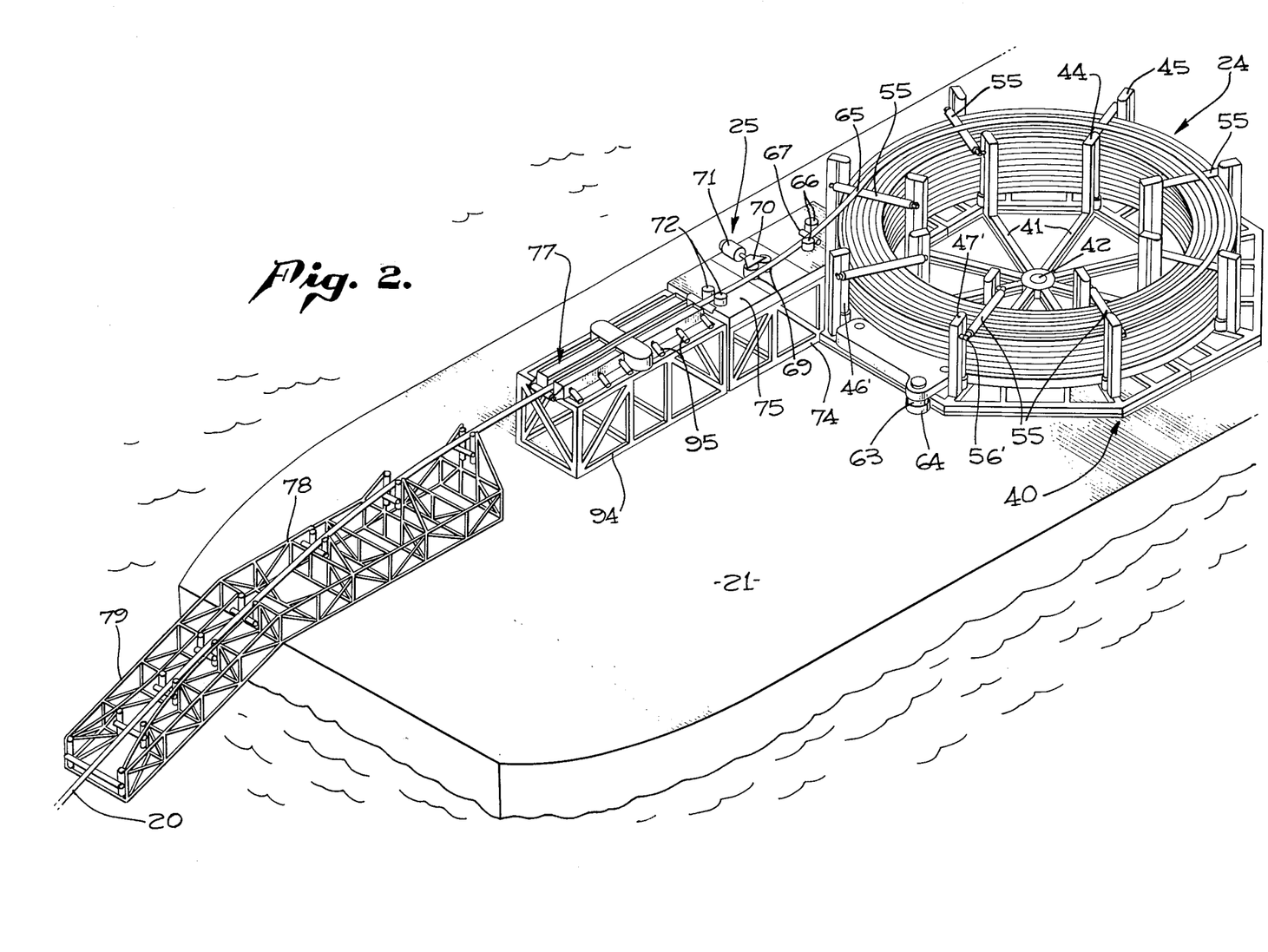
FIG. 2 is a perspective view of the vessel shown in FIG. 1 showing in more detail the pipe laying means of this invention.

In the drawings, pipe handled in accordance with the method and apparatus of this invention is schematically shown in FIGS. 1 and 2. Generally speaking, pipe 20 is placed upon pipe laying vessel 21 in the form of flat pipe spirals 22 arranged in vertically stacked units 23 adapted to be mounted for rotation about a vertical axis defined by pipe carrier means 24 mounted on the deck of vessel 21. Pipe 20 is fed from the pipe spiral units 23 by rotating pipe carrier means 24 to feed pipe 20 through a pipe straightening means 25 and then into the pipe laying system generally indicated at 26 which is described and claimed in my co-pending application Ser. No. 256,740, owned by a common assignee. Generally speaking, pipe laying system 26 includes a cable or messenger line 28 connected at one end to a subsea installation 29 and at its other end to a winch 30 whereby tension on line 28 may be maintained at a preselected tension force depending upon the conditions under which the pipe 20 is being laid. The pipe 20 is supported from messenger line 28 by a plurality of spaced hangers 31 so that the pipe, during its initial stage of feeding to a connector at subsea installation 29 will be under gravitationally produced tension. Initially the pipe may be pushed along said messenger line 28 until the gravitational pull on the pipe in the water will cause unwinding of the pipe. After the subsea connection has been made between the end of the pipe and a subsea connector, movement of the vessel away from the subsea installation will permit laying of the pipe under conditions of minimum stress since the pipe carrier means 24 may be positively driven to assist in control of movement of pipe from the pipe carrier means through the pipe straightening means 25 and tensioning means, the speed of the vessel and the linear speed of the pipe being unwound from the pipe carrier means being correlated so that the pipe is under minimum stress conditions. Other apparatus for making the connection from the vessel to the subsea installation may, of course, be used with the pipe spiral system of this invention.

Figures 4, 5:
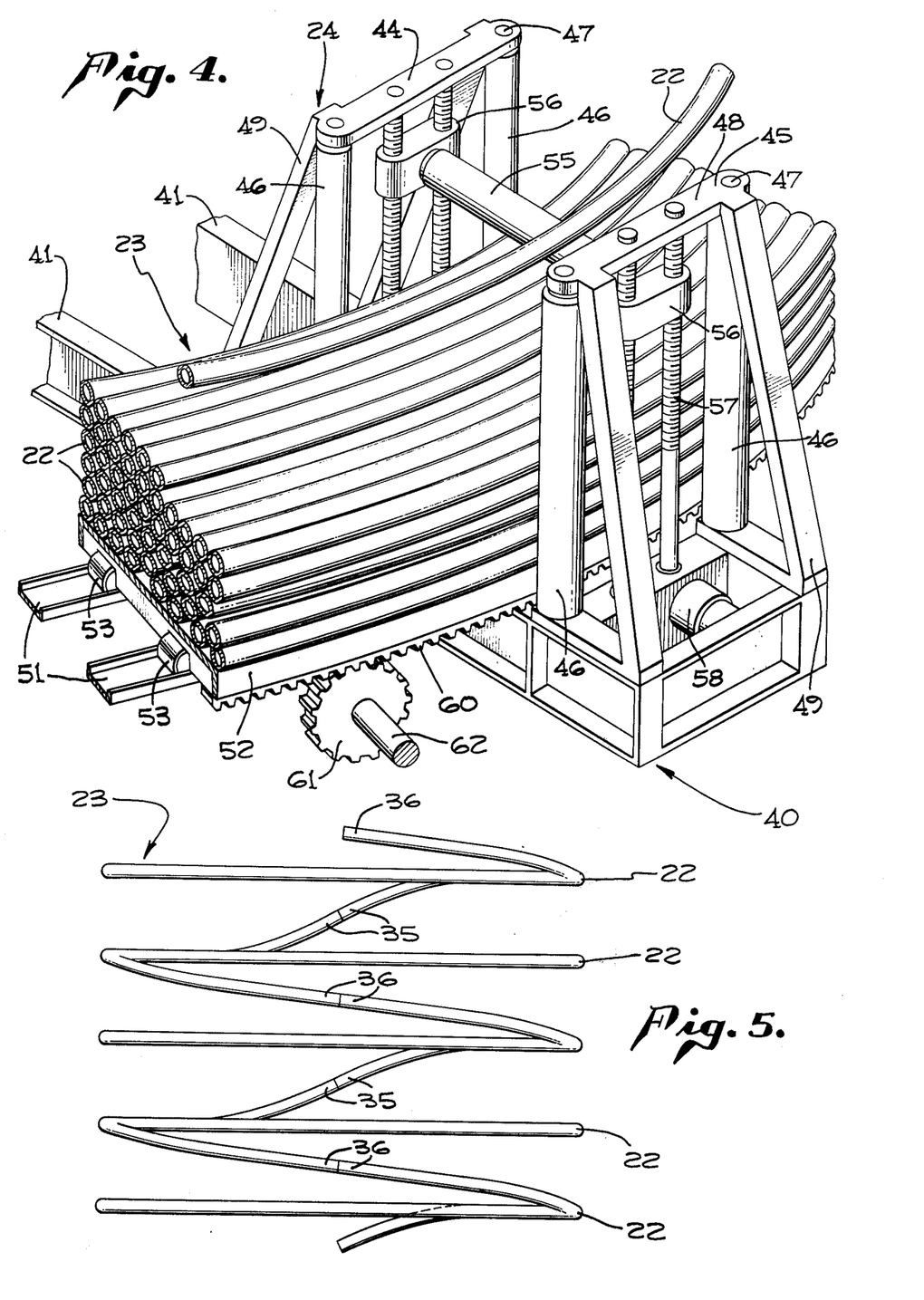
FIG. 4 is a fragmentary enlarged perspective view of the pipe spiral unit and pipe carrier means shown in FIG. 2.
FIG. 5 is a schematic elevational view showing interconnecting of a plurality of flat pipe spirals.
Figure 6:
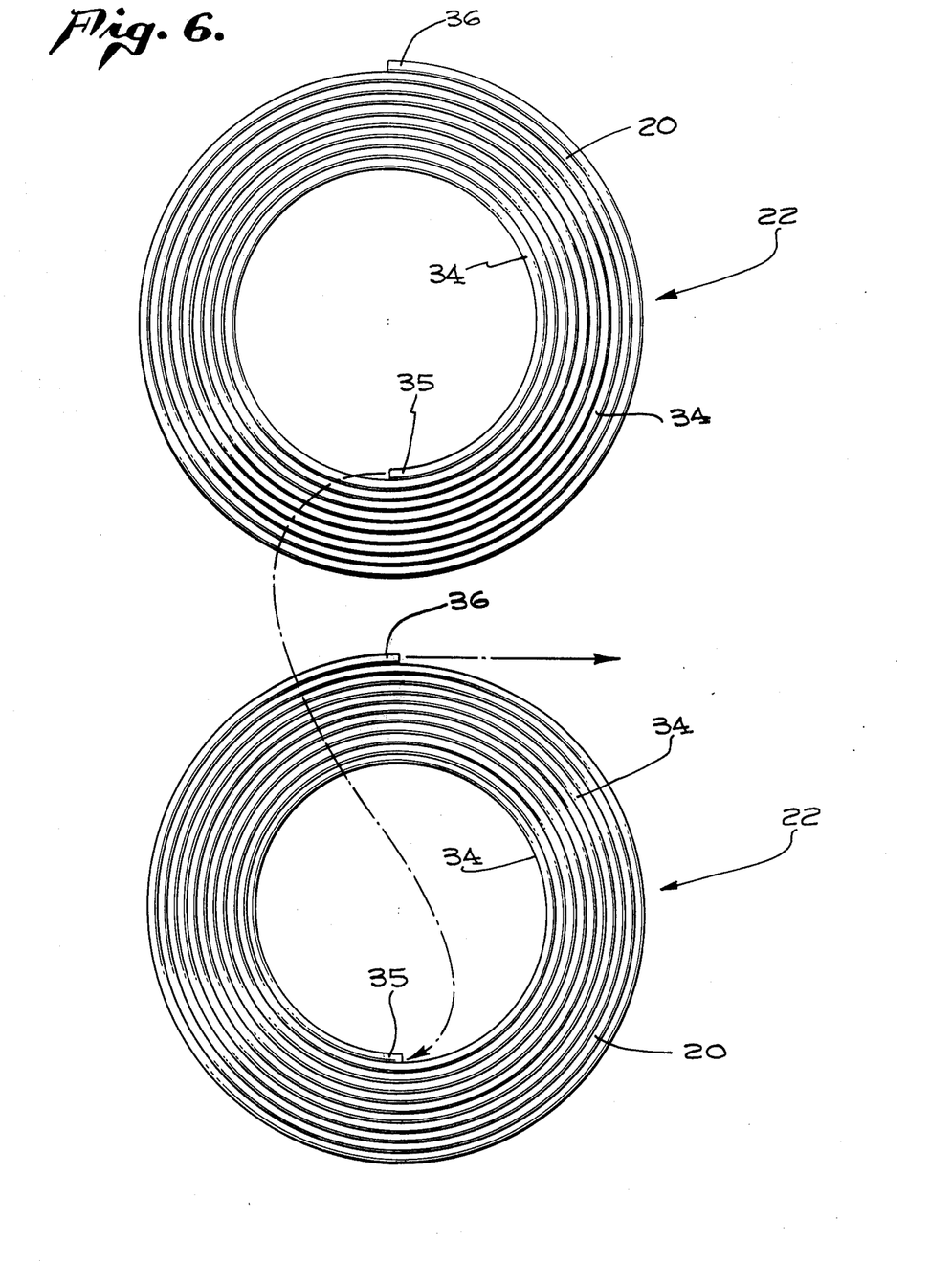
FIG. 6 is a schematic plan view illustrating the connection of flat pipe spirals embodying this invention.

Pipe spiral means 22 and pipe spiral units 23 are best described by referring to FIGS. 5 and 6. A pipe spiral 22 comprises a selected number of pipe turns 34, the innermost turn 34 defining a selected inner diameter of the flat pipe spiral 22. In this example, pipe 20 may be of a size ranging from one inch to four inches in diameter. The inner diameter of the flat pipe spiral 22 may be as small as 24 feet and the outer diameter of the flat pipe spiral 22 about 33 feet depending upon the space available on vessel 21 and also upon the equipment available at vessel 21 for loading such a pipe spiral means 23 on the vessel. It is contemplated that flat spiral 22 will be fabricated on land by suitable fixed pipe bending and coiling equipment which will impart to pipe passed therethrough bending stresses which will exceed the elastic limit of the pipe material so that the pipe coils will be retained in their coil configuration. Such pipe bending and coiling equipment is well known. It will be understood that the continuous pipe, forming the flat pipe spiral, is readily fabricated from pipe lengths which are conveniently welded end to end in an onshore plant where quality and inspection controls are readily and effectively provided. As individual pipe lengths are welded, the welded pipe is passed into the pipe bending and coiling means whereby the pipe is formed into a spiral having a selected number of turns and selected inner and outer diameters.

Preferably, the pipe is bent beyond the elastic limit of the material and about a radius of curvature which is the mean radius of the inner and outer peripheral pipe turns. Thus after effect or anelastic stresses which may impermanently reside in the turns of pipe inside and outside the mean radius of curvature may impart slight expansive and contractive stresses to the pipe turns which will aid in maintaining a compact spiral form. Bending to a mean radius of curvature also assists in maintaining a minimum change in location for the point of departure of a pipe turn which is being withdrawn from the pipe spiral as later described.

As each flat pipe spiral is completed, it may be vertically stacked upon previously made pipe flat spirals in such a manner that inner peripheral ends 35 of inner coils may be located in proximity for welding together and outer peripheral ends 36 of the next successive spiral may be welded together. Since the pipe spirals are of considerable diameter, preferably the inner and outer ends 35 and 36 may be located on a diameter so that relocation of welding equipment or turning of the flat pipe spirals may be avoided.

The flat pipe spirals are thus made in the absence of an internal cylindrical reel since the pipe turns or coils are stressed beyond the elastic limit of the material and the pipe will maintain the flat pipe spiral configuration without securement means. As indicated in FIG. 5 the spirals are superimposed over one another and upon welding of the several joints the spirals may be located in flat horizontal parallel relation and of a selected number so that a pipe spiral unit 23 may be readily handled by available equipment.

Upon fabrication of the desired number of pipe spiral units 23, such units may be shipped by suitable means to a dock or wharf for loading of the spirals on vessel 21. It will be understood that the pipe carrier means 24 provided on vessel 21 may be readily located on the deck of the vessel and is removable for relocation on another vessel if desired. It will also be noted that in the shipment of the pipe spiral means 23, essentially only pipe is being shipped. A pipe spiral means unit 23 may be lifted from the dock by a crane and loaded on pipe carrier means 24, the construction of which is now described.

As best seen in FIGS. 2 and 4, pipe carrier means 24 may comprise a base means 40 including angularly spaced structural steel members 41 arranged about a hub 42 at about 45 degrees. Base means 40 may be secured to the structure of the vessel 21 in any suitable well known manner.

At ends 43 of members 41 may be provided inboard and outboard upright stanchions 44 and 45. In the example in FIG. 4 each stanchion 44, 45 is similarly constructed and comprises a pair of upstanding rollers 46 supported on suitable vertical shafts 47. Each shaft 47 extends between a member 41 and a top bar 48 of the stanchion. Radial spacing between stanchions 44 and 45 is sufficient to relatively loosely accommodate a pipe spiral unit 23.

In the example in FIG. 2, each stanchion 44' and 45' are likewise similar in construction. Each stanchion 44', 45' includes an upstanding vertical housing providing at its upper end a pivotal mounting for vertical shaft 47' upon which an upstanding roller 46' is supported.

Base means 40 also supports between the radially spaced stanchions 44, 45 concentric circular track members 51 of upwardly facing channel section. An annular turn ring or carriage 52 is supported on track members 51 by a plurality of peripherally and radially spaced rollers 53 so that carriage 52 may be rotated relative to the stanchions 44, 45 and base means 40. Carriage 52 supports one or more flat pipe spirals 22 which form a pipe spiral unit 23.

When a pipe spiral unit 23 has been lowered and placed upon carriage 52, horizontal radially extending top idle rollers 55 may be rotatably positioned and supported from stanchions 44, 45 above the pipe spiral unit 23 to restrict vertical movement of pipe coils and to provide an annular support for the pipe turn 34 being withdrawn. Horizontal rollers 55 may be rotatably mounted and vertically adjustably supported in stanchions 44, 45 (FIG. 4) by suitable pairs of spaced threaded feed screws 57. Feed screws 57 may be rotated through suitable drive means 58 to raise and lower horizontal roller 55 to a selected elevation depending upon the height of the spiral unit 23. As pipe is withdrawn, selective lowering of certain rollers 55 remote from the pipe departure point may be desirable. It will be understood that horizontal roller 55 is detachably mounted to permit convenient removal thereof when a pipe unit 23 is being lowered onto the carrier 52.

In the example of FIG. 2, each upstanding housing may enclose a fluid actuated jack of well known form provided with a laterally extending member 56' rotatably mounting one end of a roller 55. Vertical adjustment of rollers 55 may be readily regulated to a selected height depending upon the pipe spiral unit 23.

Means for rotating carrier 52 with a pipe spiral unit 23 thereon may comprise circumferential rack teeth 60 provided on the outer peripheral bottom edge of carrier 52 and a drive pinion 61 in engagement therewith and driven by a shaft 62 connected with a gear box 63 and its associated driving motor 64. Pipe carrier 52 together with pipe spiral unit 23 carried thereby may thus be rotated in a selected direction at a positive and reduced speed. During such rotation, pipe spiral unit 23 is confined and restrained between the carriage 52, the pairs of stanchions 44, 45 circumferentially spaced apart at 45 degrees and the horizontal rollers 55 carried by each set of stanchions 44, 45.

Withdrawal of pipe from the pipe spiral is best seen in FIG. 2. The location of the point of departure of the pipe from the pipe spiral is indicated at 65 where the uppermost pipe turn is shown as being supported on top of radial idle roller 55 adjacent the pipe straightening means 25. This upper pipe turn is also supported on top of the idle rollers of the next four stanchions, the last idle roller 55 upon which the pipe turn supported being located at approximately 180 degrees from point 65. The upper pipe turn being withdrawn is located beneath the idle rollers 55 of the three remaining idle rollers on the pipe carrier means. Thus as a pipe turn is being rotated by the pipe carrier in association with its flat spiral, the pipe turn will have a tendency to return to the mean radius of curvature upon which it was initially formed and is supported by the idle radial rollers 55 upon its approach to the point of departure at 65. Thus the pipe turn being withdrawn may be fed between diagonally spaced guide rollers 66 and supported therebetween by a horizontal roller 67. The guide rollers 66 may lie along a prolongation of a tangent to the pipe spiral at approximately the mean radius of curvature of the spiral. Thus whether the pipe turn being withdrawn is an outermost or innermost pipe coil, the pipe as it reaches the point of departure 65 will normally be at approximately the mean radius of curvature of the spiral and will feed into the pipe guides 66 and 67 with a minimum of interference.

Pipe straightener 25 may comprise a plurality of rolls 69 supported about vertical axes by a frame 70 which is connected with a hydraulic cylinder means 71 to position the straightening rolls 69 with relation to the guide rolls 66 so that a reverse bend will be imparted to the pipe passing over straightening rolls 69. Beyond straightening rolls 69 is another pair of guide rolls 72. It will be noted that the entry guide rolls 66 and the departure guide rolls 72 together with the bending rolls 69 are supported upon a platform 74 having a top surface 75 of approximately the same height as the idle roll 55 at the point of departure 65 of the pipe turn being withdrawn. Thus even though the lowermost pipe spiral is being withdrawn, the location height-wise of the idle rollers 55 which support the uppermost pipe turn will feed the pipe turn into the pipe straightening means at approximately the same elevation and same radial distance from the hub so that the location of the point of departure 65 remains approximately constant.

Pipe tensioning means 77 receives the pipe from the departure guide rolls 72 and through a plurality of driven pairs of hard rubber rolls imparts a braking, tensioning or control force to the pipe passing therebetween as it is drawn from the tensioning means over a guide framework generally indicated at 78 to a stinger extension 79 from which the pipe enters the water. In FIG. 2 the arrangement of my co-pending application shown in FIG. 1 is omitted for clarity and also since other arrangments may be employed for feeding the pipe into the water.

The tensioning means 77 is shown in FIG. 3 wherein opposed matching units 81 are shown in more detail. Only one matching unit will be described since the other unit is substantially the same. Each unit 81 may generally comprise pairs of spaced rails 82 between which are rotatably mounted a plurality of driven hard rubber rolls 83 on roll shafts 84. Each shaft 84 may be provided at opposite ends with sprockets 85 for engagement with drive chains 86.

Means for driving the roller drive chains 86 may comprise, for each matching unit 81, a motor means 88 which may be hydraulic and which has a motor drive shaft 89 supported intermediate ends of the matching unit 81 by suitable members 90. Motor shaft 89 is provided with spaced drive sprockets 91 for engagement with drive chains 92 which engage one of the sprockets of the adjacent drive roller 83. As best seen from FIG. 3 each adjacent drive roller 83 is connected by a drive chain 86 alternating from one side of the unit to the other side of the unit so that each drive roller is driven positively and at approximately the same speed of rotation as the adjacent roller.

As best seen in FIG. 2 one of the matching units is fixed to the supporting framework 94 while the other unit 81 is slidably adjustably supported from the framework and is moved into pressure engagement with the pipe passing between the matching units by a plurality of longitudinally spaced hydraulic cylinders 95 connected with a common fluid pressure source (not shown). Thus the pressure exerted on the pipe passing between the rollers of the matching units may be adjusted to provide a desired braking or tensioning force on the pipe being fed into the water.

In the initial phase of connecting a continuous pipe to a subsea installation, the capability of driving the pipe carrier means and the tensioning rolls 83 to move the pipe along the tensioned messenger line or cable provides novel control means for handling the pipe during this phase of the operation. The rate of advancement of the pipe is readily controlled by the rate at which the tensioning rolls and the pipe carrier means are driven. In the event it becomes necessary to stop the movement of the pipe or to retract movement of the pipe, reducing and reversing the direction of rotation of the tensioning rolls 83 and the pipe carrier means will permit the pipe to be manipulated in accordance with the existing conditions.

After a pipe spiral unit 23 has been substantially unwound during a pipe laying operation, and when the end of the last flat spiral unit on the pipe carrier means reaches the departure point 65, the top radial horizontal rollers 55 may be detached and moved into a noninterferring position to permit a second pipe spiral unit 23 to be lowered and placed in position on the pipe carrier means. The adjoining ends of the flat spiral on the new unit 23 and the remaining pipe spiral 22 may then be welded together to provide a continuous pipe. It will be apparent that such joining together of successive spiral units 23 may be accomplished while the pipe is kept under effective control. Successive pipe spiral units 23 may be welded to pipe being laid in similar manner to afford virtually continuously laying of pipe.

It will be readily apparent that the present invention permits wide flexibility in the handling of pipe for continuous laying thereof in a subsea installation. Pipe may be readily fabricated into pipe spirals of a diameter which can be readily handled by available equipment. The number of flat spirals 22 which may comprise a pipe spiral unit or assembly 23 may also be varied in accordance with the pipe handling facilities. In addition, the pipe carrier means may be readily relocated on different vessels and therefore may be employed in a variety of situations. Since essentially only pipe spiral units are being handled and not the massive additional dead weight of reel configurations, the handling of such pipe spiral units is economical both in terms of handling equipment and in equipment required for retention of a pipe spiral unit in assembled form. To reduce costs in the preparation, welding, and handling in the conversion of separate individual pipe length into a continuous long pipe line, the pipe spiral of this invention may be utilized to supply a selected length of readily handled pipe to other types of pipe laying equipment. For example, instead of welding straight pipe lengths on a barge for winding on a cylindrical pipe reel, prewelded continuous pipe in spiral form may be fabricated on shore and transferred to a barge for placement or further winding on a cylindrical type reel.

It will also be apparent to those skilled in the art that the pipe ends are maintained under effective control when welding one pipe spiral unit to another pipe spiral unit during a pipe laying operation.

It will be understood that various modifications and changes may be made in the method of and apparatus for handling and laying pipe as described above and all such modifications and changes coming within the scope of the appended claims are embraced thereby.

I claim:

1. In a method of forming a flat annular pipe spiral unit which is stressed to facilitate unwinding of the unit by departure of pipe from the annular unit at a selected location with respect to the radius and axis of the unit and to maintain the unit in spiral form, the steps of:

providing a continuous pipe;

forming said continuous pipe into a flat annular spiral having a plurality of turns lying in a plane;

said turns including an inner turn defining the inner diameter of the spiral unit and an outer turn defining the outer diameter of said unit, and intermediate turns between said inner and outer turns, each of said inner, outer, and intermediate turns being progressively bent about a radius which is the mean radius of the annular spiral unit, whereby bending stresses in said turns cause each of said turns to seek the radial position of the intermediate turn formed at the mean radius upon unwinding of said annular unit and to retain said flat spiral configuration.

2. In a method of handling continuous pipe to facilitate laying said pipe between spaced locations, comprising the steps of:

forming a stack of pipe spiral units, each of which is made in accordance with the method of claim 17, placing said stack on a pipe carrier means rotatable about the axis of the stack, rotating said pipe carrier means and said spiral unit thereon, separating a portion of the turn, which is being unwound from the stack, from its spiral unit to permit initially imposed bending stresses in said separated turn to cause said portion of the separated turn to be free to bend to seek its mean radius, restricting axial displacement of turns other than the separated turn;

and directing the separated turn into a pipe straightener means at a departure point of said separated turn tangential to said mean radius;

whereby each of the turns of the spiral units in the stack departs said carrier at a point tangentially located at about the main radius of the spiral unit and in alignment with the path of the pipe into the pipe straightener means.

3. In a method as stated in claim 2 wherein the step of separating includes supporting about 180 degrees of the departing separated turn in axial spaced relation to the remainder of the turns of the spiral units.

4. In an apparatus for laying a continuous pipe including a pipe straightening means, the combination of:

a base means;

a circular track means arranged about a vertical axis on said base means;

a rotatable pipe carrier means on said track means for rotation about said vertical axis;

annular pipe spiral means carried and supported by said pipe carrier means;

said spiral means including inner, intermediate and outer turns of pipe, each turn being bent about the mean radius of all of said turns for stressing turns relative to the turn at the mean radius;

pairs of upstanding stanchions circumferentially spaced on said base means around said circular track means;

said pairs of stanchions having means for restricting said pipe spiral turns against movement radially inwardly, radially outwardly, and axially of said circular track means, said latter restricting means at a selected portion of said circular track means serving to separate and support a portion of the turn being withdrawn from the pipe spiral means;

means controlling rotation of said pipe carrier means for rotating said pipe spiral means;

said turn being withdrawn and supported on said restricting means tending to seek a position at the mean radius of said spiral means, and said pipe straightener means being substantially tangentially aligned with said mean radius for receiving said pipe turn being withdrawn with a minimum of lateral interference.

5. In an apparatus as stated in claim 4 wherein said annular pipe spiral means includes a plurality of spiral units, each unit having each of its turns bent and stressed about the same means radius of the spiral means.

6. In an apparatus as stated in claim 4 including means for adjusting the vertical height of the latter restricting means in respect to the height of the pipe spiral means.

7. An article of manufacture comprising:

a continuous pipe formed into a flat annular spiral unit having a plurality of turns lying in a plane, said turns including an inner turn defining the inner diameter of said spiral unit, an outer turn defining the outer diameter of said spiral unit, and a plurality of intermediate turns between said inner and outer turns, said spiral unit having a mean radius lying between said inner and outer turns, said inner, outer, and intermediate turns having bend stress extending beyond the elastic limit of the pipe material and about said mean radius whereby stresses in turns radially, outwardly and inwardly of said mean radius serve to maintain inner and outer dimensional stability of the spiral unit and whereby a turn being unwound departs said annulus at a point approximately tangent to said mean radius.

* * * * *

UNITED STATES PATENT AND TRADEMARK OFFICE
CERTIFICATE OF CORRECTION

PATENT NO. : 3,965,713
DATED : June 29, 1976
INVENTOR(S) : Edward E. Horton

It is certified that error appears in the above—identified patent and that said Letters Patent are hereby corrected as shown below:

Column 9, line 5, change "17" to - - 1 - -.

Signed and Sealed this

Fourteenth Day of September 1976

[SEAL]

Attest:

RUTH C. MASON
Attesting Officer

C. MARSHALL DANN
Commissioner of Patents and Trademarks